April 15, 1924. 1,490,093
C. COPLANTZ
RUNNING GEAR FOR TRUCKS, ETC
Filed Jan. 14, 1921   2 Sheets-Sheet 1
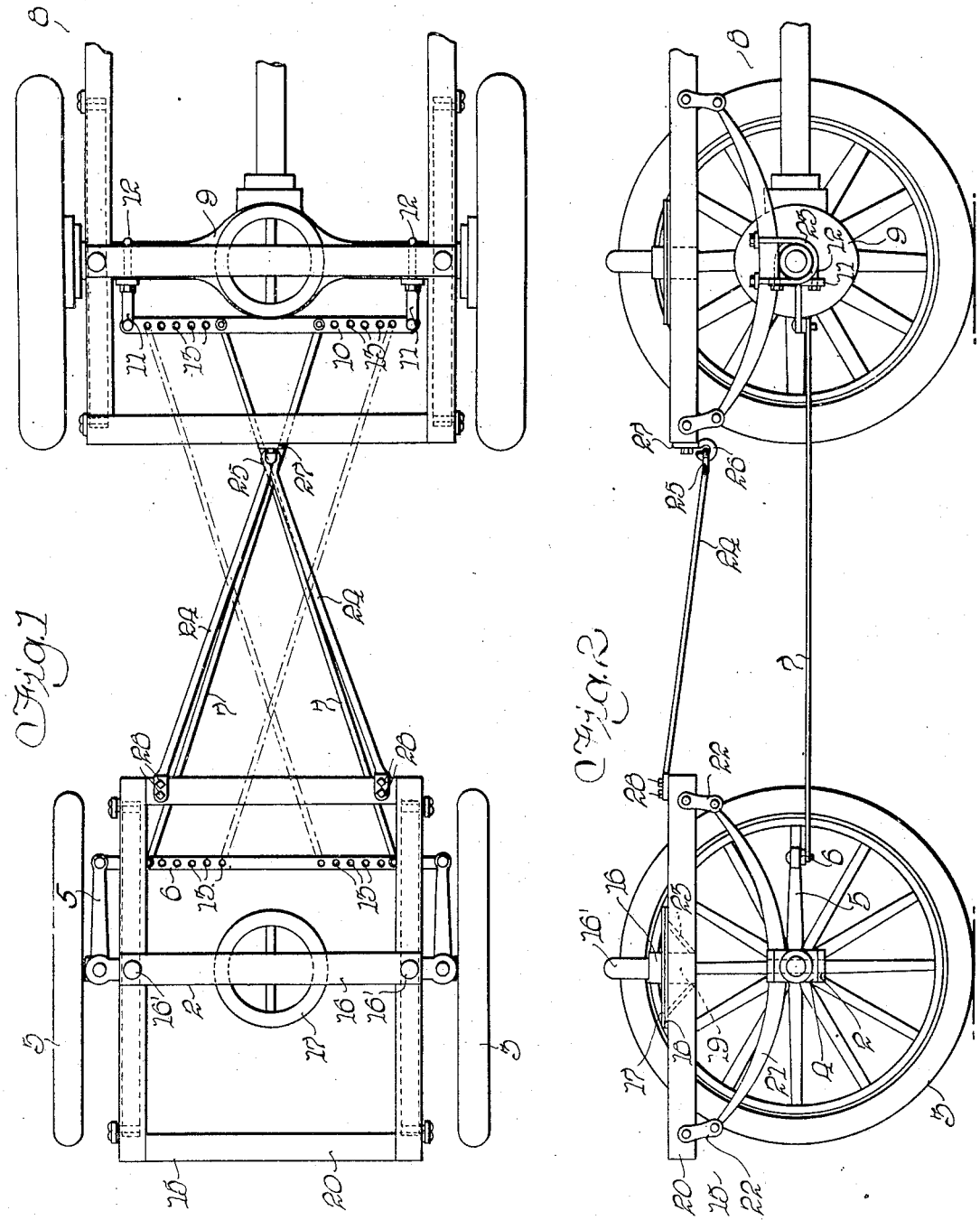
Inventor
Cyrus Coplantz
By Brown Boettcher & Dinner Attorneys April 15, 1924. 1,490,093
C. COPLANTZ
RUNNING GEAR FOR TRUCKS, ETC
Filed Jan. 14, 1921 2 Sheets-Sheet 2
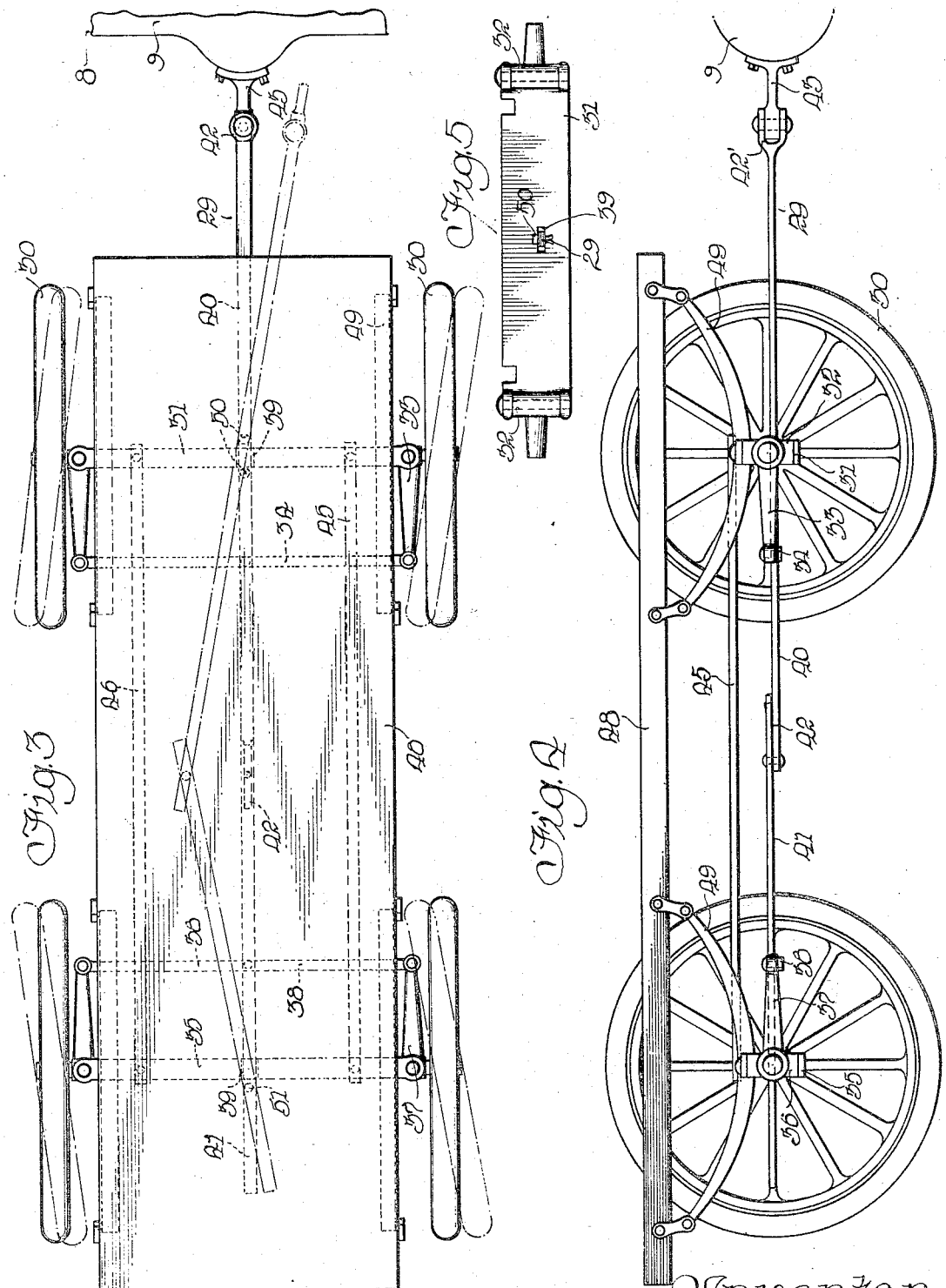
Inventor
Cyrus Coplantz
By Brown Bottener Dinny
Attorneys Patented Apr. 15, 1924.

1,490,093

UNITED STATES PATENT OFFICE.

CYRUS COPLANTZ, OF JOLIET, ILLINOIS.

RUNNING GEAR FOR TRUCKS, ETC.

Application filed January 14, 1921. Serial No. 437,163.

*To all whom it may concern:*

Be it known that I, CYRUS COPLANTZ, a citizen of the United States, residing at Joliet, in the county of Will and State of Illinois, have invented a certain new and useful Improvement in Running Gears for Trucks, Etc., of which the following is a full, clear, concise, and exact description, reference being had to the accompanying drawings, forming a part of this specification.

My invention relates to running gears for trailers.

My invention has particular reference to that class of trailing vehicles adapted to be drawn by a truck or tractor as an extension thereof for carrying loads. It will be apparent, however, from the appended description, that numerous novel features may be advantageously employed in other types of vehicles, and it is to be understood that the scope of the present invention is not limited to trailing vehicles.

One of the principal objects of the invention is to provide improved and simplified connecting means between the trailer and preceding vehicle whereby the turning radius of the trailer wheels may be varied within a certain range of adjustment.

Another object is to provide an improved form of road carrying frame in connection with the connecting means so that, irrespective of the angle of turn taken by the trailer wheels, the load being carried will be free to turn independently. The load carrying frame is pivotally supported upon the trailer and receives a load extending from the vehicle. When the vehicle turns in its direction of travel, the load thereon will also turn, causing the load carrying frame of the trailer to pivotally move on its support. The running gear of the trailer is thereby permitted to turn independently, being governed according to the adjustment of the connecting means.

A final object of my invention is to provide a trailer of simplified construction which can be manufactured at minimum expense.

In the drawings:

Figure 1 is a top plan view of the trailer embodying my invention;

Figure 2 is a side elevation of the same with one of the wheels removed;

Figure 3 is a top plan view illustrating a trailer embodying an alternative form of my invention; and Figure 4 is a side elevational view of the same also having the wheels removed;

Figure 5 is a detailed view of an axle, illustrating the manner of securing the reach.

The trailer illustrated in the drawings may not necessarily be of the particular design shown in order to embody the features of the present invention, and hence, the description given will be considered more or less as illustrative and subject to various changes. This trailer is adapted to be attached to a pilot vehicle, or, if desired, to a series of trailers, whose construction is also not necessarily essential to that shown.

Referring to Figures 1 and 2 of the drawings, the axle 2 of the trailer suitably carries the wheels 3 by means of the usual knuckles 4, which knuckles have projecting therefrom the steering arms 5. In order that the steering arms move in unison, there is provided the cross bar 6, which pivotally connects with the steering arms, and which is adapted to be connected by means of the diagonal steering rods 7 to the truck or tractor 8.

According to the form of truck shown, the differential housing 9 of the rear axle carries a cross bar 10 which is similar to the cross bar 6. Brackets 11 are provided and secured at each end of the housing by the U-bolts 12, the free end of the brackets connecting with the ends of the cross bar 10. In the cross bar 6 and cross bar 10 are provided a plurality of spaced apertures 13, the apertures of one bar aligning with the apertures of the other bar. These apertures receive suitable securing means, such as pins or bolts, engaging with the ends of the steering rods 7. As the steering rods 7 cross each other, the wheels 3 of the trailer will be caused to swing outwardly when the truck 8 turns, the swing being the turning radius, will be controlled by the position of the steering rods in respect to the apertures of the cross bars 6 and 10.

The load supporting frame 15 of the trailer is free to move in respect to the running gear described above by reason of the fact that the load being carried continues in a straight line during the turning movement while the wheels follow a curve described by a common point. The load supporting frame comprises the bolster 16, lying transverse to the trailer, with vertical posts 16' at each end to prevent lateral displacement of the load. This bolster has pivotal movement about a fifth wheel having a rotatable ring 17 on the bolster which ring 17 suitably bears upon a rigid disk 18.

The structure provided for carrying this arrangement consists of a transverse beam 19 carried by a rectangular frame 20. The rigid disk 18 is mounted upon the beam 19 by the brackets 23. The usual leaf springs 21 are employed to support the frame 20 by means of the pivotal links 22, these springs 21 being carried in any suitable manner upon the axle 2.

A similar arrangement has been employed upon the rear of the truck 8 which co-operates with the fifth wheel of the trailer. The springs 21 in this instance are carried by the axle or differential housing 9 by the U-bolts 23.

The tractive stress is transmitted from the truck 9 to the trailer through the draw rods 24 which at the truck end is pivotally carried by the eye 25 thereof engaging the hooks 26 of the bracket 27. The other or opposite ends of the draw rods rigidly connect with the rectangular frame 20 in any manner, such as the bolts 28. It is to be noted that by the use of the draw rods 24 in connection with the steering rods 7, the usual swaying of the trailer is effectively prevented, and also tilting which is incidental to this type of trailer.

In the construction illustrated in Figures 3 and 4, a type of trailer having the usual double set of wheels is shown, wherein steering of the wheels is secured through the medium of a reach member 29 extending longitudinally of the trailer. The front wheels 30 are mounted in the usual way, upon the axle 31, the knuckles 32 having the steering arms 33 projecting therefrom and connected by the cross arm 34 so as to secure unison in operation. The rear wheels are similarly mounted upon the rear axle 35 with the knuckles 36 having the steering arms 37 connected by the cross bar 38. As shown in Figure 5, the front axle 31, which is similar to the rear axle in construction, is provided with a central aperture 39 through which passes the reach 29. The aperture 39 is larger in width than the reach which permits of the reach lateral play in the aperture; the purpose of which will be presently described.

The reach 29 consists of front and rear members 40 and 41 respectively which join each other midway of the axles 31 and 35 in the form of a slotted connection 42 which opens laterally with the turn of the truck. The front member 40 terminating in a forked end 42' has pivotal connection with a bracket 43 carried by the rear axle housing of the truck. It is not necessary that the bracket 43 connect with the housing 9, but may connect at any other point or attachment at the rear of the truck. The cross bars 34 and 38 are each pivotally connected with the respective parts of the reach 29, so that when the reach is moved by turning of the truck, the front wheels 30 will turn parallel to the front member 40 and the rear wheels will turn parallel to the rear member 41, as shown in dotted lines in Figure 3. This gives each set of wheels the proper turning radius which will be dependent upon the turn taken by the pulling vehicle.

The axles 31 and 35 are secured in rigid relation with each other by the longitudinal connecting members 45 and 46 disposed at each side of the reach 29 which causes the wheels to swivel independent of the axles. The table 48 of the trailer is mounted upon the axle in any suitable manner such as by the suspension springs 49 carried by the axles 31 and 35.

The tractive stress is exerted through the reach 29 in this instance and is imparted to the axles of the trailer by means of pins 50 in the member 40 at each side of the front axle 34. A pin 51 is provided in the member 41 to the rear of the axle 38. The apertures 39 in both of the axles are large enough to prevent the reach members 40 and 41 from turning the axles, thereby allowing only the cross bars 34 and 38 to be affected by the lateral movement of the reach 29.

It will be apparent from the foregoing that I have provided by the form shown in Figures 1 and 2 a trailer having a running gear arrangement which will permit the turning radius to be varied by means of rods connecting with the rear of the preceding vehicle, which rods may increase or decrease the steering leverage according to their adjusted position with respect to the two vehicles. In connection with this, the draw bars transmitting the tractive stresses effectively prevent the usual swaying and tilting, while the fifth wheel construction, which is employed, allows the wheels of the trailer to take a turning course independent of the turning of the load. This feature is considered important, when employed in connection with the running gear provided, upon this type of trailer, as loads such as ladders of considerable length often cause much trouble when it is desired to turn at a sharp angle with a trailer following, to form an extension to carry the load of the vehicle.

In the second construction embodying my invention the novel manner of forming the reach member and connecting it with the cross bars, which control the steering arms, has resulted in producing a trailer which also is characterized by the ability to permit its running gear to turn independent of the load.

I claim:

In combination, a vehicle chassis including a body, a trailer comprising an axle with steerable wheels, a frame on said axle, and fifth wheel load carrying means, fifth wheel carrying means above the rear axle of said chassis, a rigid prolongation of said frame pivoted centrally to the rear end of said body, a cross bar connected to said trailer wheels to steer them, a cross bar on said body in front of said pivotal connection, rigid crossed links connecting said two cross bars and actuating said rear cross bar to steer the wheels at all times toward a position in alignment behind said body, and means for shifting said links to vary the effectiveness of said action.

In witness whereof I hereunto subscribe my name this 10th day of January, 1921.

CYRUS COPLANTZ.